Aug. 15, 1967     W. D. GARDEN     3,336,152

HEAT SEALABLE POLYPROPYLENE FILM AND METHOD OF MAKING

Filed Dec. 9, 1963

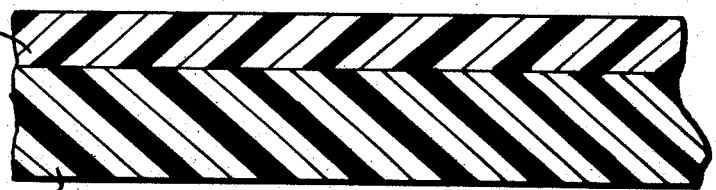

HEAT SEALABLE COATING COMPRISING NITROCELLULOSE AND A PLASTICIZER CONTAINING AT LEAST 50% BY WEIGHT OF A NORMALLY SOLID PLASTICIZER SELECTED FROM:
(1) N-CYCLOHEXYL P-TOLUENESULPHONAMIDE
(2) N-PHENYL P-TOLUENESULPHONAMIDE
(3) N-CYCLOHEXYL BENZENESULPHONAMIDE

STEREOREGULAR POLYPROPYLENE FILM HAVING A SURFACE OXIDATIVE TREATMENT

INVENTOR.
WILLIAM DAVID GARDEN
BY
Cushman, Darby & Cushman
ATTORNEYS

# United States Patent Office 3,336,152
Patented Aug. 15, 1967

3,336,152
HEAT SEALABLE POLYPROPYLENE FILM AND METHOD OF MAKING
William David Garden, Saltcoats, Scotland, assignor to Imperial Chemical Industries Limited, London, England, a corporation of Great Britain
Filed Dec. 9, 1963, Ser. No. 329,216
Claims priority, application Great Britain, Dec. 14, 1962, 47,252/62
7 Claims. (Cl. 117—47)

This invention relates to heat-sealable films suitable for packaging and to a process of modifying polypropylene film material to render it heat-sealable.

Polypropylene has many of the properties which are desirable in a packaging film. For example, it is strong, transparent and is almost impermeable to water and water-vapour. However, its use as a packaging material has hitherto been restricted because of the difficulty of heat sealing it.

We have now discovered that polypropylene film which has been subjected to a surface oxidative treatment adheres satisfactorily to coating layers derived from certain plasticised nitrocellulose lacquers to give a composite film of which the coated faces can be satisfactorily heat-sealed together.

According to the present invention a heat-sealable film is a laminar film comprising a layer of stereoregular polypropylene which has been subjected to a surface oxidative treatment and an adhering coating layer on at least one of the surfaces of the polypropylene, which coating layer comprises industrial nitrocellulose and plasticiser therefor, at least 50 percent by weight of the plasticiser being constituted by normally solid materials.

Industrial nitrocellulose is nitrocellulose having an average nitrogen content between 10.7 and 12.2 percent by weight.

The ratio of nitrocellulose to plasticiser should preferably be within the range 10:5 to 10:15 by weight in order to give coating layers which can be heat-sealed at reasonably low temperatures and which are not so "tacky" as to "block" or stick together in storage.

The surface oxidative treatment to which the polypropylene has been subjected may, for example, consist in heating the surface by means of a flame or it may be a chemical treatment such as treatment with ozone, chromic acid or mixtures of sulphuric acid and sodium dichromate. Preferably, however, the film surface is treated by corona discharge.

A method of treating materials in film form by corona discharge is described in U.K. Patent 715,914. Preferably, the treatment is such that the angle of contact between water and the film is reduced thereby from an angle of over 90° for the untreated film to an angle of 80° or less.

The plasticiser for industrial nitrocellulose is a material which, when in the molten state, is a solvent for the nitrocellulose and therefore acts to plasticise or soften it. To obtain film having the strongest adhesion between the coating material and the polypropylene layers the proportion of solid constituent in the plasticiser should be kept high. However, it is sometimes advantageous for the plasticiser to contain a proportion of a material which is normally liquid, such as, for example triethyl citrate. The tendency for some solid plasticisers to crystallise out of compositions containing high proportions of solid plasticisers is thereby reduced and the resulting coated films have improved flexibility at low temperature. The proportion of solid constituents in the plasticiser must not be below 50 percent by weight or the adhesion between the layers may be too weak for practical requirements. Of the solid materials normally employed for plasticising nitrocellulose we have found N-cyclohexyl p-toluenesulphonamide, N-phenyl p-toluenesulphonamide and N-cyclohexyl benzenesulphonamide to be particularly advantageous in giving coating layers which adhere very strongly to the polypropylene layer.

The coating layer may also, if desired, comprise a proportion of a resinous material to improve the adhesion between the layers and the strength of the heat-seal between the coated faces of the film. Such ingredients may consist of resins commonly used in nitrocellulose lacquers such as, for example, rosin, rosin esters, products of reaction between rosin and its derivatives with maleic anhydride natural resins and vinyl polymers containing polar groups. Preferably the proportion of resinous material in the composition of the coating layer is less than the proportion of nitrocellulose and the ratio of the combined weight of resinous material and nitrocellulose to plasticiser should preferably be within the range 10:5 to 10:15.

In accordance with the process of the invention, polypropylene film is modified to give a heat-sealable film by first subjecting the film to a surface oxidative treatment and applying to at least one surface of the film a lacquer prepared by dissolving the constituents of the coating layer in a solvent, and drying off the solvent. A suitable solvent is a mixture of butyl aceate and toluene in the ratio of 6:4. The lacquer may conveniently contain about 10 percent by weight of the material of the coating layer.

The lacquer may, if desired, be incorporated into an aqueous emulsion and applied to the polypropylene in the emulsified form.

The invention is further illustrated by the following examples in which all parts and percentages are by weight.

In Examples 1–33 lacquers were prepared by dissolving the non-volatile ingredients intended to form the coating layer in a solvent consisting of 6 parts butyl acetate and 4 parts toluene to give a concentration of 10 percent of the coating layer ingredients in the solution. The nitrocellulose was industrial nitrocellulose having an average nitrogen content between 11.2 and 11.8 percent, "damped" with isopropanol in the ratio 30 parts isopropanol to 70 parts nitrocellulose. 20 g. (as dry) of this nitrocellulose dissolved in 100 cc. aqueous acetone prepared by mixing 95 volumes acetone with 5 volumes water had a viscosity of 15–25 poises at 20° C.

Biaxially drawn polypropylene film 0.013 millimeter thick was subjected to corona discharge to the extent that the contact angle of a drop of water on its surface was 72°. The lacquers were spread on the surface of the polypropylene and the solvent removed by evaporation. Sufficient lacquer was applied to give a coating layer 0.0013 millimeter thick.

Two pieces of the resulting films were laid flat with their coated faces in contact and heat-sealed over an area 5 centimetres x 1.5 centimetres by pressing between heat-sealing jaws at 130° C., a pressure of 0.28 kg./cm.² (gauge) and a dwell time of ½ second. A strip 2.5 centimetres wide was cut from the sealed portions to give a sealed area 1.5 centimetres long by 2.5 centimetres wide and two free ends. The ends were pulled apart by a tensile testing machine at a constant peel rate of 6 centimetres per minute and the maximum force required (recorded in grams) was determined.

The drawing is a diagrammatic representation of the article.

*Examples 1–11*

In these examples the coating layer consisted of nitrocellulose and solid plasticiser. The heat-seal strengths obtained with several plasticisers at various ratios of nitrocellulose to plasticiser are set forth in Table 1.

TABLE 1

| Example | Solid Plasticiser | M.P., °C. | Heat-seal strength (grams) Ratio NC: solid plasticiser | | | |
|---|---|---|---|---|---|---|
| | | | 10:12.5 | 10:10 | 10:7.5 | 10:5 |
| 1 | Tricyclohexyl citrate | 57 | | 64 | 40 | 3 |
| 2 | Glyceryl tribenzoate | 71 | 23 | 36 | 39 | 3 |
| 3 | Dicyclohexyl phthalate | 65 | 24 | 26 | 41 | 4 |
| 4 | Ethyl o-benzoylbenzoate | 55 | 30 | 25 | 24 | 40 |
| 5 | Di-isobutyl tartrate | 67 | 20 | 23 | 25 | 11 |
| 6 | Ethyl acetanilide | 54 | 20 | 23 | 52 | 21 |
| 7 | Diphenyl phthalate | 69 | 50 | 70 | 72 | 9 |
| 8 | Triphenyl phosphate | 48 | 20 | 22 | 30 | 13 |
| 9 | N-cyclohexyl p-toluenesulphonamide | 86 | 60 | 80 | 69 | 30 |
| 10 | N-phenyl p-toluenesulphonamide | 103 | 57 | 67 | 70 | 50 |
| 11 | N-cyclohexyl benzenesulphonamide | 85 | 45 | 54 | 133 | 114 |

*Examples 12–14*

In these examples the plasticiser used was a mixture of dicyclohexyl phthalate and p-toluenesulphonamide (M.P. 137° C.). The heat-seal strengths obtained are set forth in Table 2.

TABLE 2

| Example | Lacquer proportions (parts) | | | Heat-seal strength (grams) |
|---|---|---|---|---|
| | Nitro-cellulose | Dicyclohexyl phthalate | p-Toluene-sulphonamide | |
| 12 | 10 | 7.5 | 2.5 | 80 |
| 13 | 10 | 5.0 | 5.0 | 35 |
| 14 | 10 | 2.5 | 7.5 | 30 |

*Examples 15–27*

In these examples the coating consisted of 10 parts of nitrocellulose, 10 parts of N-cyclohexyl p-toluenesulphonamide and either 2.5 or 5 parts of a resin as set forth in Table 3. The heat-seal strengths of the films are also recorded in Table 3.

TABLE 3

| Ex. | Resin | Heat-seal strength (grams) | |
|---|---|---|---|
| | | 2.5 parts resin | 5.0 parts resin |
| 15 | Wood rosin | 144 | 92 |
| 16 | Rosin/glycerol ester gum | 130 | 140 |
| 17 | Esterifield rosin/maleic condensate | 150 | 103 |
| 18 | Rosin/pentaerythritol ester | 161 | 72 |
| 19 | Maleic resin | 105 | 138 |
| 20 | Vinylchloride/vinyl acetate 87/13 | 116 | 120 |
| 21 | Reduced esterifield (glycerol) phenol formaldehyde | 85 | 106 |
| 22 | Dammar resin (dewaxed) | 178 | 124 |
| 23 | Cyclohexanone resin | 173 | 92 |
| 24 | Coumarone-indene resin | 152 | 112 |
| 25 | Fumaric condensate | 103 | 110 |
| 26 | Copal resin | 130 | 110 |
| 27 | Copal/glycerol ester gum | 160 | 93 |

*Examples 28–31*

In these examples the film coating consisted of 10 parts nitrocellulose, 10 parts solid plasticiser and 5 parts of a resin as set forth in Table 4. The heat-seal strengths of the films are also given in Table 4.

TABLE 4

| Ex. | Solid Plasticiser | Resin (parts) | Heat-seal strength (grams) |
|---|---|---|---|
| 28 | Glyceryl tribenzoate | Maleic resin | 66 |
| 29 | do | Esterified rosin/maleic condensate | 72 |
| 30 | Dicyclohexyl phthalate | Rosin/pentaerythritol ester gum | 81 |
| 31 | do | Coumarone-indene resin | 59 |

*Example 32*

In this example the coating layer on the film consisted of 10 parts nitrocellulose, 8 parts N-cyclohexyl p-toluenesulphonamide and 2.5 parts of a liquid plasticiser, methyl abietate. The heat-seal strength of the film was 81 grams.

*Example 33*

The coating layer of this example was the same as in Example 32 except that it contained 5.0 parts of methyl abietate. The heat seal strength of the film was 43 grams.

*Example 34*

A lacquer having the following composition was prepared.

| | Parts |
|---|---|
| Nitrocellulose (as used in Examples 1–33) | 10 |
| N-cyclohexyl p-toluenesulphonamide | 8 |
| Esterified rosin/maleic condensate | 3 |
| Butyl acetate | 30 |
| Butyl alcohol | 15 |
| Ethylene glycol mono-butyl ether | 15 |
| Toluene | 40 |
| Phenolic polyethylene oxide condensate (emulsifying agent) | 0.8 |

30 parts of the lacquer were mixed with 10 parts of water containing 0.2 part of a water-soluble polyacrylate thickener, by means of a high speed stirrer to give an emulsion. The emulsion was spread on a layer of polypropylene film as used in the previous examples and the coated film was heated at 100° C. for 2 minutes. A clear transparent coating layer having a thickness of 0.0013 millimetre was obtained.

The heat-seal strength of the film determined as in the previous examples was 140 grams.

What I claim is:

1. A heat-sealable film comprising a layer of stereo-regular polypropylene which has been subjected to a surface oxidative treatment whereby the angle of contact between water and the treated surface is 80° or less, and an adhering coating layer on at least one of the surfaces of the polypropylene, which coating layer comprises nitrocellulose having an average nitrogen content of between 10.7 and 12.2% by weight and a plasticizer containing at least 50% by weight of a normally solid plasticizer selected from the group consisting of N-cyclohexyl p-toluenesulphonamide, N-phenyl p-toluenesulphonamide and N-cyclohexyl benzenesulphonamide, the ratio of nitrocellulose to plasticizer being within the range of 10:5 to 10:15 by weight.

2. A heat-sealable film as claimed in claim 1 wherein the surface oxidative treatment is treatment by corona discharge.

3. A heat-sealable film as claimed in claim 1 wherein the coating layer comprises a proportion of a liquid plasticiser.

4. A heat-sealable film as claimed in claim 1 wherein the coating layer comprises a proportion of resinous material.

5. A heat-sealable film as claimed in claim 4 wherein the proportion of resinous material in the coating layer is less than the proportion of nitrocellulose and the ratio of the combined weight of resinous material and nitrocellulose to plasticiser is within the range 10:5 to 10:15.

6. A process for the production of a heat-sealable film which comprises subjecting a film of polypropylene to a surface oxidative treatment sufficient to reduce the angle of contact between water and the treated surface to 80° or less, applying to at least one treated surface of the film a lacquer prepared by dissolving in a solvent nitrocellulose having an average nitrogen content of between 10.7 and 12.2% by weight and a plasticizer containing at least 50% by weight a normally solid plasticizer selected from the group consisting of N-cyclohexyl p-toluenesulphonamide, N-phenyl p-toluenesulphonamide and N-cyclohexyl benzenesulphonamide, the ratio of nitrocellulose to plasticizer being within the range of 10:5 to 10:15 by weight, and drying off the solvent.

7. A process as claimed in claim 6 in which the applied lacquer is incorporated into an aqueous emulsion and applied to the polypropylene in the emulsified form.

References Cited

UNITED STATES PATENTS

| | | | |
|---|---|---|---|
| 2,668,134 | 2/1954 | Horton | 117—138.8 |
| 2,715,076 | 8/1955 | Wolinski | 117—138.8 |
| 2,770,555 | 11/1956 | Cornwell | 117—144 XR |
| 2,931,732 | 4/1960 | Hoffman | 117—144 XR |
| 2,950,992 | 8/1960 | Brillhart | 117—144 XR |
| 3,023,126 | 2/1962 | Underwood et al. | 117—138.8 |
| 3,202,528 | 8/1965 | James | 117—47 |
| 3,232,789 | 2/1966 | Pelzek et al. | 117—138.8 |
| 3,236,675 | 2/1966 | Hermitte et al. | 117—138.8 |

MURRAY KATZ, *Primary Examiner.*